US012212914B2

(12) United States Patent
Chng et al.

(10) Patent No.: US 12,212,914 B2
(45) Date of Patent: Jan. 28, 2025

(54) INFORMATION HANDLING SYSTEM HEADSET WITH ADJUSTABLE EARCUP POSITION FOR STEREO AND MONO AUDIO PRESENTATION

(71) Applicant: Dell Products L.P., Round Rock, TX (US)

(72) Inventors: Eng Kang Chng, Singapore (SG); Karthikeyan Krishnakumar, Austin, TX (US); Wong Hin Loong Justin, Singapore (SG)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 17/868,339

(22) Filed: Jul. 19, 2022

(65) Prior Publication Data

US 2024/0031718 A1 Jan. 25, 2024

(51) Int. Cl.
*H04R 1/10* (2006.01)

(52) U.S. Cl.
CPC ......... *H04R 1/1041* (2013.01); *H04R 1/1008* (2013.01); *H04R 1/1058* (2013.01); *H04R 1/1091* (2013.01)

(58) Field of Classification Search
CPC ...... H04R 1/10; H04R 1/1008; H04R 1/1041; H04R 1/1066; H04R 1/1091; H04R 1/105; H04R 5/033; H04R 5/0335
See application file for complete search history.

(56) References Cited

U.S. PATENT DOCUMENTS

| | | | |
|---|---|---|---|
| 8,666,083 B2 | 3/2014 | Yamkovoy et al. | |
| 9,560,451 B2 | 1/2017 | Eichfeld et al. | |
| 10,390,122 B2 | 8/2019 | Degraye et al. | |
| 2008/0152160 A1 | 6/2008 | Chew et al. | |
| 2009/0154738 A1 | 6/2009 | Pal | |
| 2013/0279724 A1 | 10/2013 | Stafford et al. | |
| 2022/0021977 A1* | 1/2022 | Carrigan .................. | H04R 5/04 |

* cited by examiner

*Primary Examiner* — Kile O Blair
(74) *Attorney, Agent, or Firm* — Zagorin Cave LLP; Robert W. Holland

(57) ABSTRACT

A headset presents audio sounds with first and second speakers disposed in first and second earcups that fit over first and second of an end user's ears. One ear cup adjusts with a greater travel distance relative to the other earcup so that the headset rests on the end user head with the one earcup raised above an ear and the other on an ear. A position sensor disposed in the headset detects the headset configuration to turn off audio at the speaker of the earcup that is displaced from the ear while increasing volume at the speaker of the earcup that remains over an ear. In addition, when only one ear is covered by an earcup, the audio presentation converts from stereo to monoaural.

18 Claims, 13 Drawing Sheets

INFORMATION HANDLING SYSTEM HEADSET WITH ADJUSTABLE EARCUP POSITION FOR STEREO AND MONO AUDIO PRESENTATION

BACKGROUND OF THE INVENTION

Field of the Invention

The present invention relates in general to the field of information handling system audio presentation, and more particularly to an information handling system headset with adjustable earcup position for stereo and mono audio presentation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components disposed in a housing and present the information to an end user, such as with audiovisual presentation. Desktop information handling systems typically operate at a fixed location in cooperation with peripheral devices that interface through cable and wireless communications, such as a keyboard, a mouse, a display, speakers, a microphone and a headset. Portable information handling systems integrate processing components, a display and a power source in a portable housing to support mobile operations and can also interface with peripheral devices like a desktop system. Portable information handling systems allow end users to carry a system between meetings, during travel, and between home and office locations so that an end user has access to processing capabilities while mobile. When using either a desktop or portable information handling system, end users will often wear a headset to listen to audio output and to speak into a microphone included with the headset. The headset helps to keep conversations private by playing audio directly into an end user's ear and by the end user talking into a microphone near the end user's mouth. In addition, the headset provides improved audio with stereo played directly to each ear and, in some instances, noise cancellation.

Generally, a headset having earcups that enclose a speaker against an end user's head provide a good audio experience by blocking out external noise, yet, the pressing of an ear cup against an end user head can create some discomfort when a headset is worn for an extended time period. In addition, the earcup muffles external sound so that desired external sounds are often unintelligible, such as when a nearby person is speaking to the end user or other audio sources are of interest to an end user. Some end users find it difficult to have a conversation while earcups block the sound of their own voice. To provide temporary access to external sounds, end users will sometimes place an earcup in front of or behind the ear so that the ear is exposed to external sounds. In some instances, the end user might simply lift the earcup away from the ear while listening to external sounds and then place it back when finished listening. Pulling an earcup out of position temporarily is often viewed as an inconvenience and disrupts end user listening to audio as one speaker playing stereo at a greater distance than the other tends to generate a low quality sound.

SUMMARY OF THE INVENTION

Therefore, a need has arisen for a system and method which adjusts headset audio presentation based upon headset earcup position.

In accordance with the present invention, a system and method are provided which substantially reduce the disadvantages and problems associated with previous methods and systems that adjust audio from a headset based upon headset position. A position sensor of the headset detects when an earcup of the headset is displaced away from an end user ear and, in response to a determination that the headset is operating in a one speaker configuration, adjusts audio presented from the headset.

More specifically, an information handling system includes processing components that cooperate to process information, such as a processor and memory that cooperate to execute instructions that generate audio information. The audio information is communicated to a headset having first and second speakers in first and second earcups for presentation as audible sound in each of an end user's ears, such as stereo sound. A position sensor disposed in the headset detects when the earcups have a single speaker configuration in which one earcup places a speaker over an ear and the other earcup displaces the speaker from the ear, such as above the ear. For instance, a strap position sensor detects when one of the straps retracts in to a headband more than a normal operating range and, in response, adjusts the audio presented from the speakers. For example, audio at the displace speaker is turned off and audio at the speaker remaining positioned to stay over the ear is played in monoaural mode instead of stereo and is played at a louder volume. When the headset reconfigures to a dual speaker configuration, such as with straps in a normal operating travel length position, the audio returns to both speakers in stereo and at the selected volume.

The present invention provides a number of important technical advantages. One example of an important technical advantage is that a headset adapts audio presented to an end user when the end user removes and earcup from placement over an ear, such as to take a rest from headset use or to listen to external sounds. Turning off audio at the displaced earcup reduces the end user's distraction and allows the end user to better listen to external sounds. Adjusting the audio at the remaining earcup to play in stereo instead of monoaural and to increase the volume, helps to improve the end user experience with better audio presentation adapted to the headset configuration in an automated manner.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system headset detects an earcup displace from an ear to adjust presentation of audible information. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
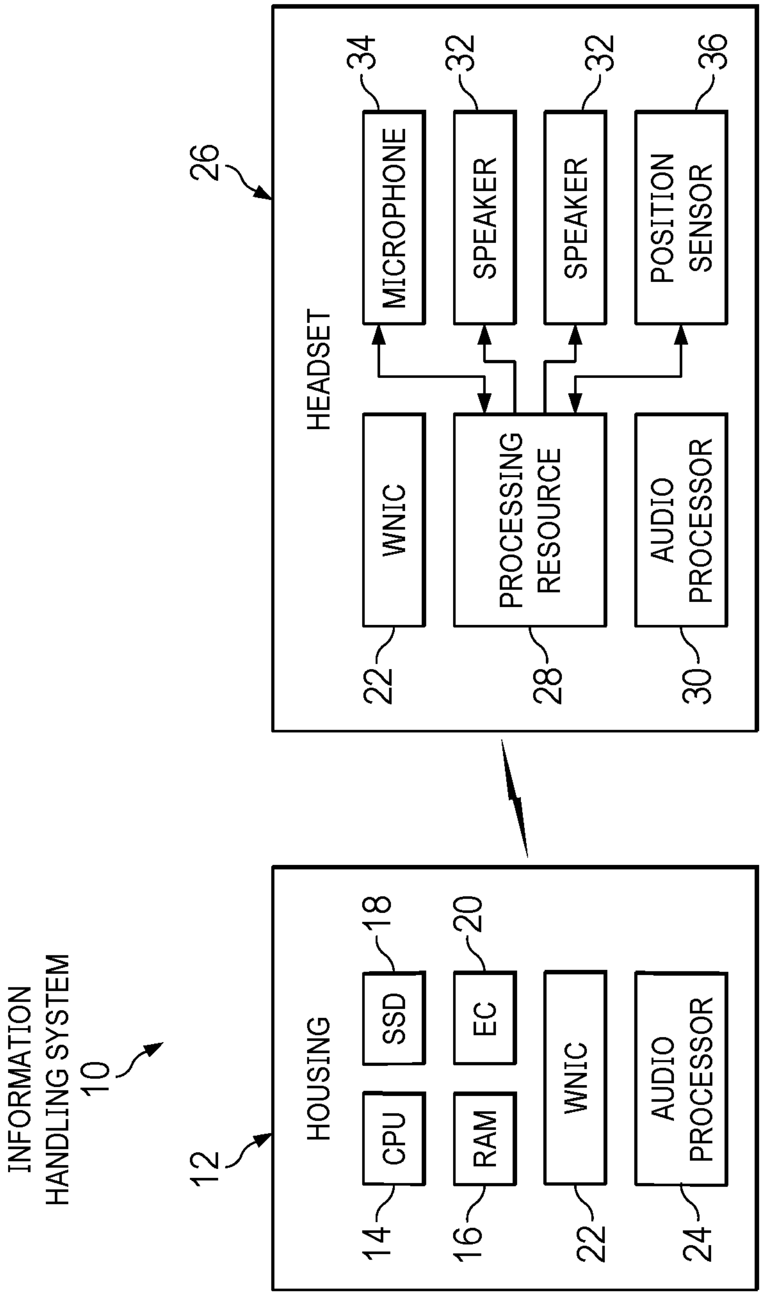
FIG. 1 depicts a block diagram of an information handling system having a headset that detects a single earcup configuration to adjust audio presentation.

Referring now to FIG. 1, a block diagram depicts an information handling system 10 having a headset 26 that detects a single earcup configuration to adjust audio presentation. In the example embodiment, information handling system 10 has a stationary housing 12, such as a desktop system, that houses processing components that cooperate to process information. In alternative embodiments, portable information handling systems having a portable housing may be used, such as tablets, laptops and/or convertible systems. A central processing unit (CPU) 14 executes instruction to process information in cooperation with a random access memory (RAM) 16 that stores the instructions and information. A solid state drive (SSD) 18 provides persistent storage of instructions and information, such as a operating system and applications that are retrieved at power up to RAM 16 for execution on CPU 14. An embedded controller 20 manages operation of the processing component, such as application of power and interactions with peripheral devices USB and other cable interfaces. A wireless network interface controller (WNIC) supports wireless communications with external networks and peripheral devices, such as with WiFi and BLUETOOTH. An audio processor 24 interfaces with CPU 14 to process information for presentation as audible sounds. In the example embodiment, WNIC 22 communicates audio information to a headset 26 for presentation as audible sounds. A WNIC 22 on headset 26 receives the audio information under the management of a processing resource 28 and in cooperation with an audio processor 30 plays the audio information as audible sound at speakers 32. A microphone 34 of headset 26 captures audible sounds and communicates the audible sounds to information handling system 10, such as speech of an end user in support of a telephone or video conference.

Headset 26 includes logic that adjusts output of speakers 32 based upon whether one or both speakers are places against an end user's ear to present audio. For instance, processing resource 28 includes flash memory that stores instruction that when executed on processing resource 28 monitor a position sensor 36 to determine whether one or both speakers 32 are in position to play audio. When both speakers are in position to play audio, the audio is presented as configured, such as in stereo sound. When only one speaker is in position to play audio, the instruction adjust the sound by one or more of turning off audio at the speaker not in position to play, increasing volume of audio at the speaker in position to play, and presenting the audio as monoaural instead of stereo at the one speaker in position to play. Processing resource 28 may perform additional instructions based upon the output of position sensor 36, such as turning off noise cancellation and increasing speaker sound to only a limit volume, such as increasing volume of the single speaker by 6 dB only to a maximum safe volume setting. As is described in greater detail below, position sensor 36 detects difference in length that the speakers are extended to determine that both speakers are not located over an ear. In alternative embodiments, other techniques may be used to detect that a speaker is displace from an ear, such as monitoring a noise cancellation microphone in an earcup that encloses the speaker.

Figure 2:
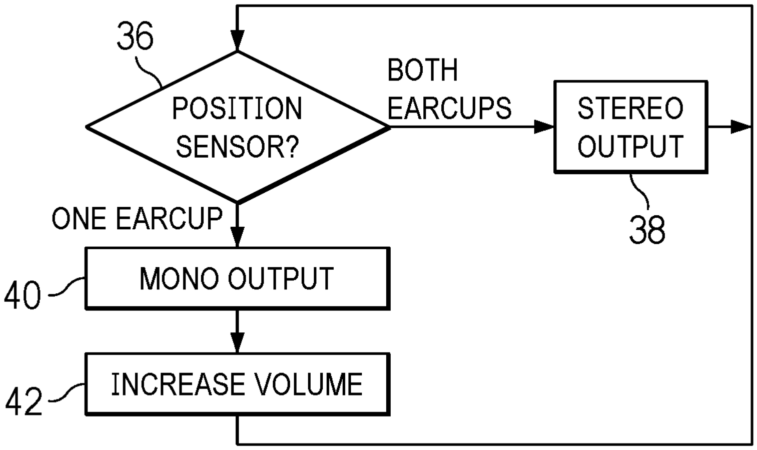
FIG. 2 depicts a flow diagram of a process for adjusting audio presentation at a headset based upon earcup position.

Referring now to FIG. 2, a flow diagram depicts a process for adjusting audio presentation at a headset based upon earcup position. At step 36 the position sensor is read to determine the headset earcup positions. When the headset earcup positions indicate that both ears are covered by an earcup so that a speaker is not displaced from an ear, the process continues to step 38 to output sound as stereo if available or, in any event, without adjustment from the defined audio output for a dual speaker headset. The process then returns to step 36 to continue monitoring the position sensor. If at step 36 the position sensor indicates a headset configuration associated with one earcup displaced from the end user ear, the process continues to step 40 to adjust the audio output for a single ear speaker output. At step 40, the audio at the displaced ear speaker is turned off and the audio at the ear that has a speaker proximate to it is output as monoaural instead of stereo. At step 42, the volume of audio sound from the speaker that remains active is increased, such as by 6 dB or to a maximum allowed volume output. From step 42 the process returns to step 35 to continue monitoring the headset position sensor for changes in the placement of the speakers proximate the end user ears.

Figure 3A:
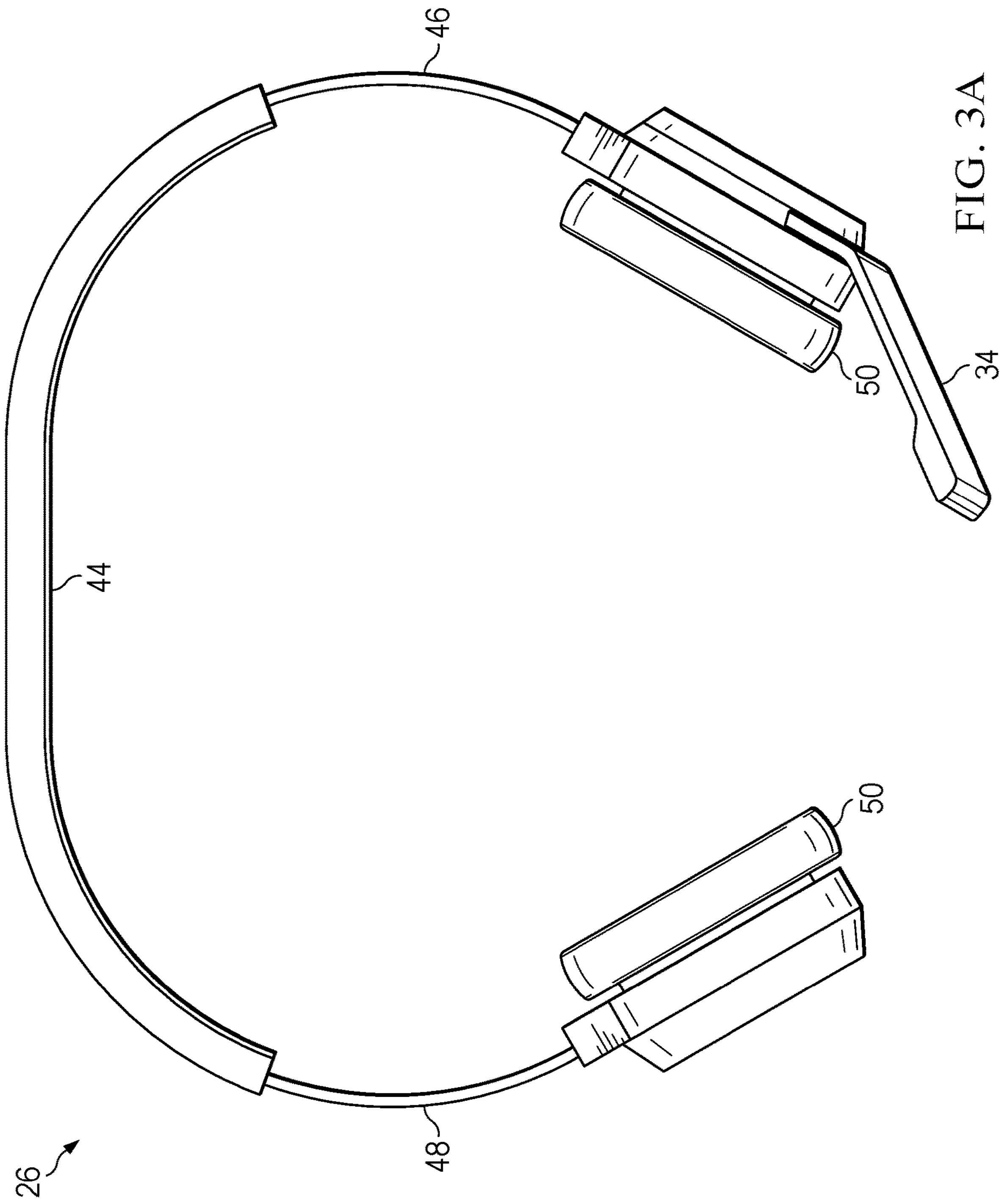
FIGS. 3A, 3B and 3C depict the head set in dual ear and single ear configurations.
Figure 3B:
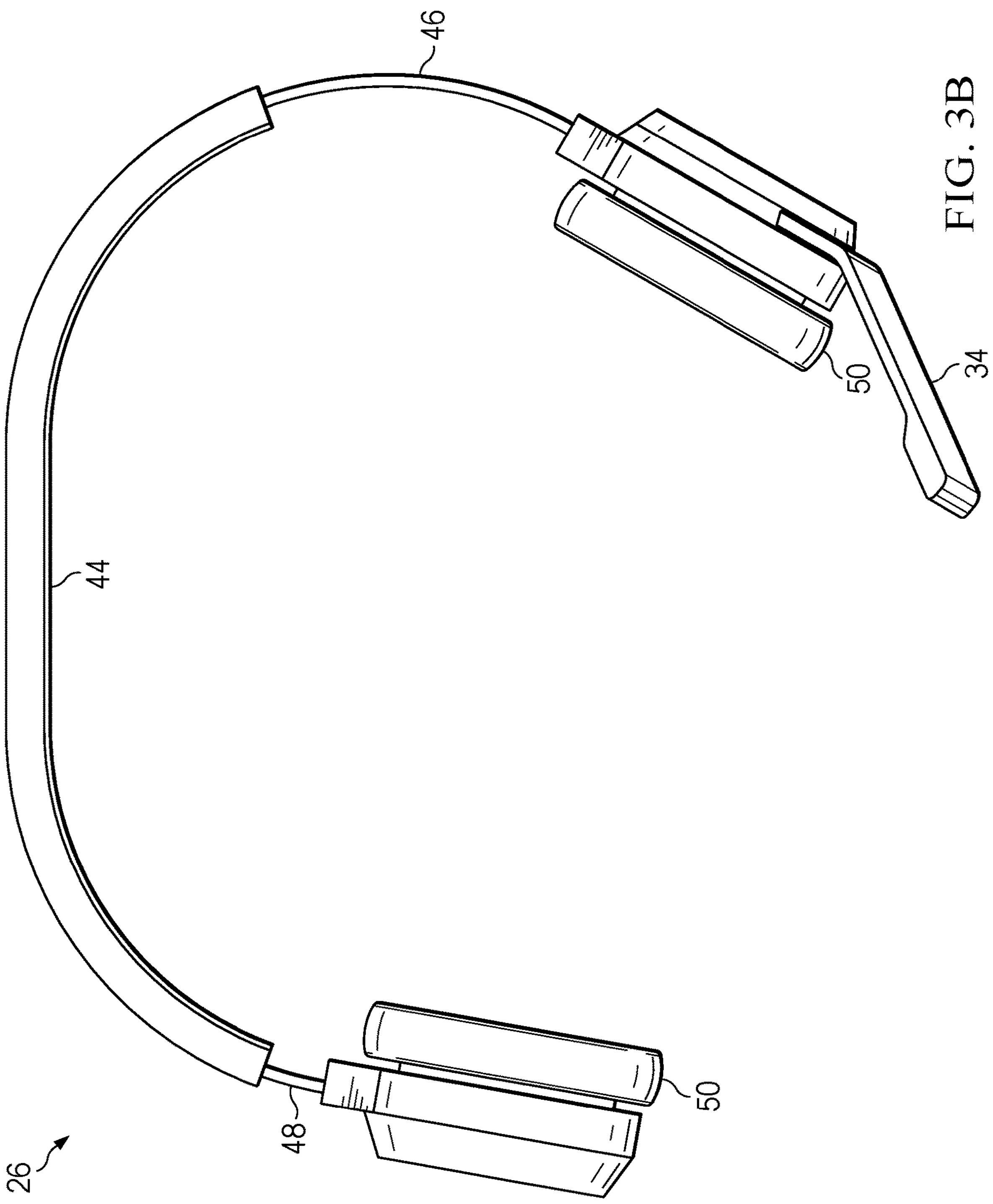
Figure 3C:
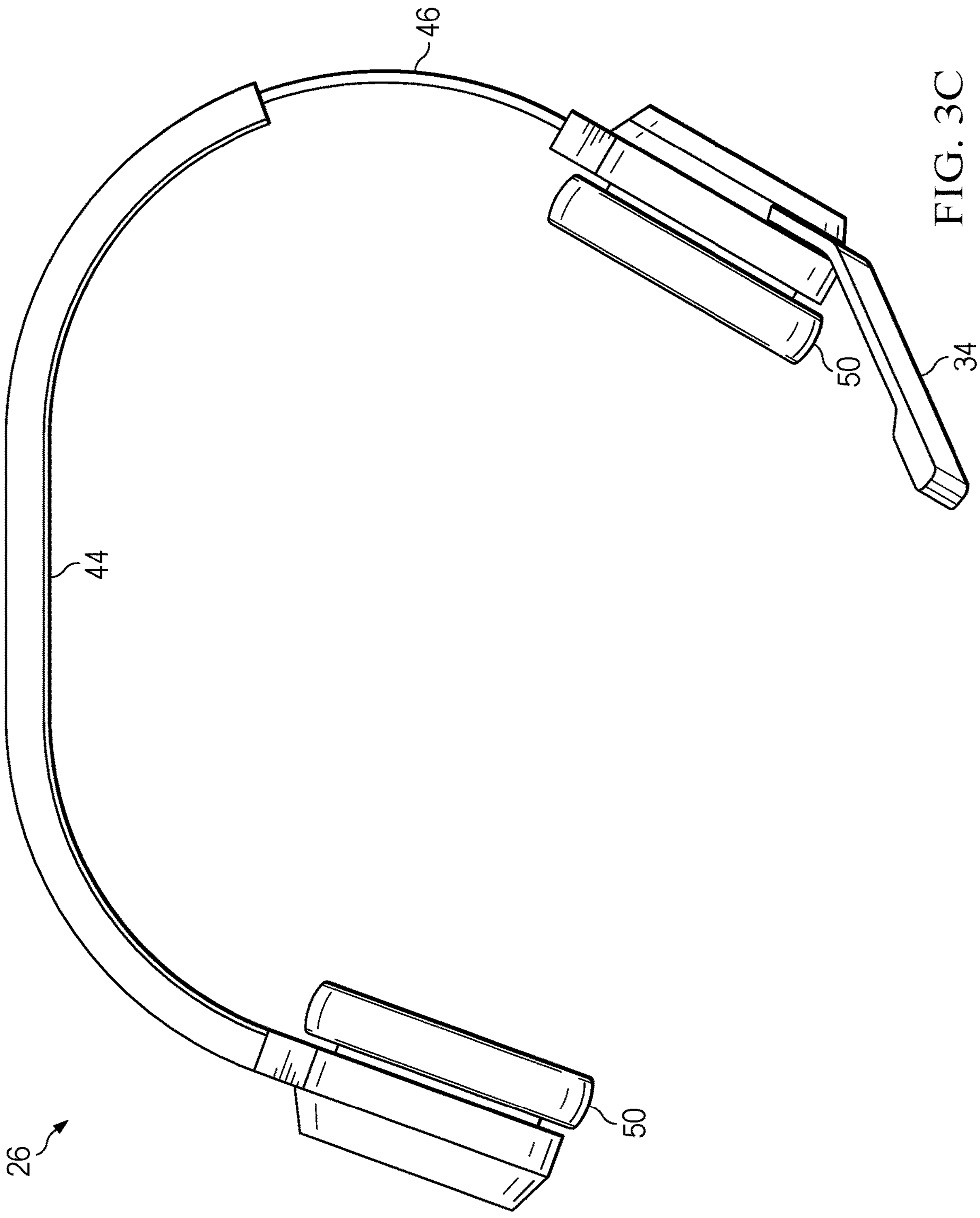

Referring now to FIGS. 3A, 3B and 3C, the headset 26 is depicted in dual ear and single ear configurations. FIG. 3A depicts a side view of headset 26 in a dual ear placement configuration having both earcups 50 adjusted to a substantially equal travel distance by headband 44 straps 46 and 48. When headset 26 is worn by an end user with the configuration of FIG. 3A, an earcup 50 is placed over each ear of an end user and microphone 34 aligns at the speaker's mouth to record sound of spoken voice. In this dual ear mode, both speakers output volume and, if available, play in stereo. FIG. 3B depicts headset 26 in a single ear audio presentation configuration with headband 46 strap 48 just less than fully retracted so that earcup 50 coupled to strap 48 has a raised position displaced over the ear of an end user. In the example embodiment, the earcup 50 having microphone 34 retracts with strap 46 with a smaller travel distance than the strap 48 so that microphone 34 remains in place to accept speech when in the single ear configuration. In this single ear configuration, audio plays only at the earcup that remains aligned with an ear, and when the audio has stereo for dual ear presentation the audio at the single ear is played as monoaural. In the configuration depicted by FIG. 3B, the earcup opposite the microphone is displaced above the end user ear but has additional travel to raise further so that smaller heads can wear the headset in the one ear configuration. FIG. 3C depicts the earcup opposite the microphone in a fully retracted position that raises the earcup to fully displace above an ear of a smaller head. In the range of movement for the earcup opposite the microphone as depicted by FIGS. 3B and 3C, sound is adjusted, such as by turning of audio in that earcup and playing monoaural in the other earcup. The range of movement between the position depicted by FIG. 3B and FIG. 3C provide for a range of head sizes that can use the headset with the one earcup displaced above an ear. As is set forth in greater detail below, both earcups 50 adjust within a normal dual ear configuration range while strap 48 has a greater travel distance than strap 46 so that travel of strap 48 beyond the shared range of strap 46 provides an indication of a position of earcups 50 for a single ear configuration. Detection of an earcup position within the range shown by FIGS. 3B and 3C commands adjustment of audio play.

Figure 4:
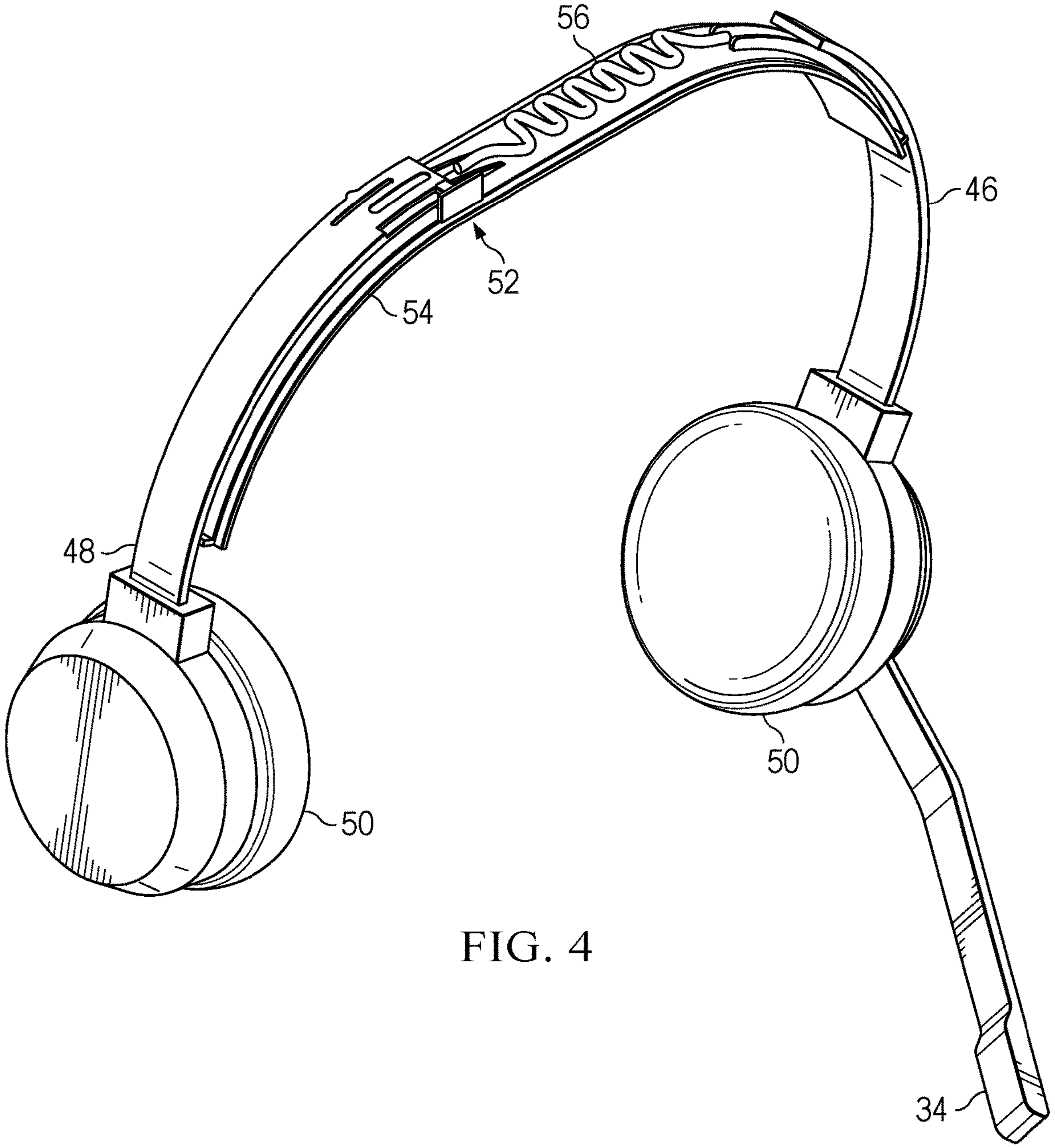
FIG. 4 depicts an upper perspective view of the headset having an upper cover of the headband removed.

Referring now to FIG. 4, an upper perspective view depicts the headset 26 having an upper cover of the headband removed. In the example embodiment, headset 26 has a single ear configuration with strap 48 fully retracted relative to the lower headband portion 54 that guides movement of straps 46 and 48. A strap location position sensor 52 monitors the position of strap 48 relative to lower headband portion 54 to detect retraction of strap 48 by a travel distance that indicates displacement of that earcup 50 from an end user ear, such as in a raised position relative to the ear and the earcup 50 on the opposing side of headset 26. A coiled wire 56 having a resilient cover to provide a spring effect interfaces strap position sensor 52 and a speaker in earcup 50 with a processing resource of headset 26.

Figure 5A:
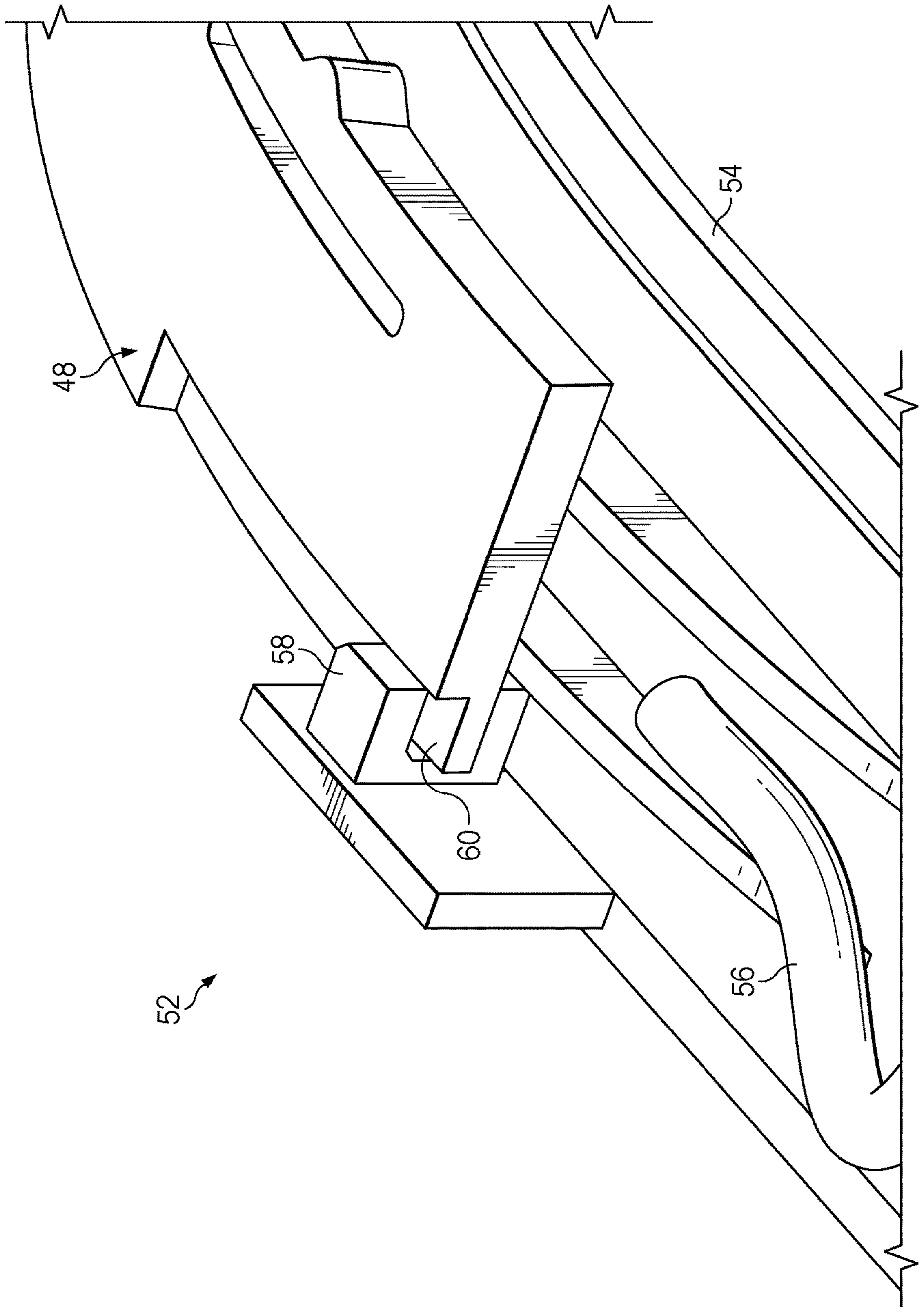
FIGS. 5A and 5B depict example embodiments of the position sensor disposed in the headband to detect the earcup positions.
Figure 5B:
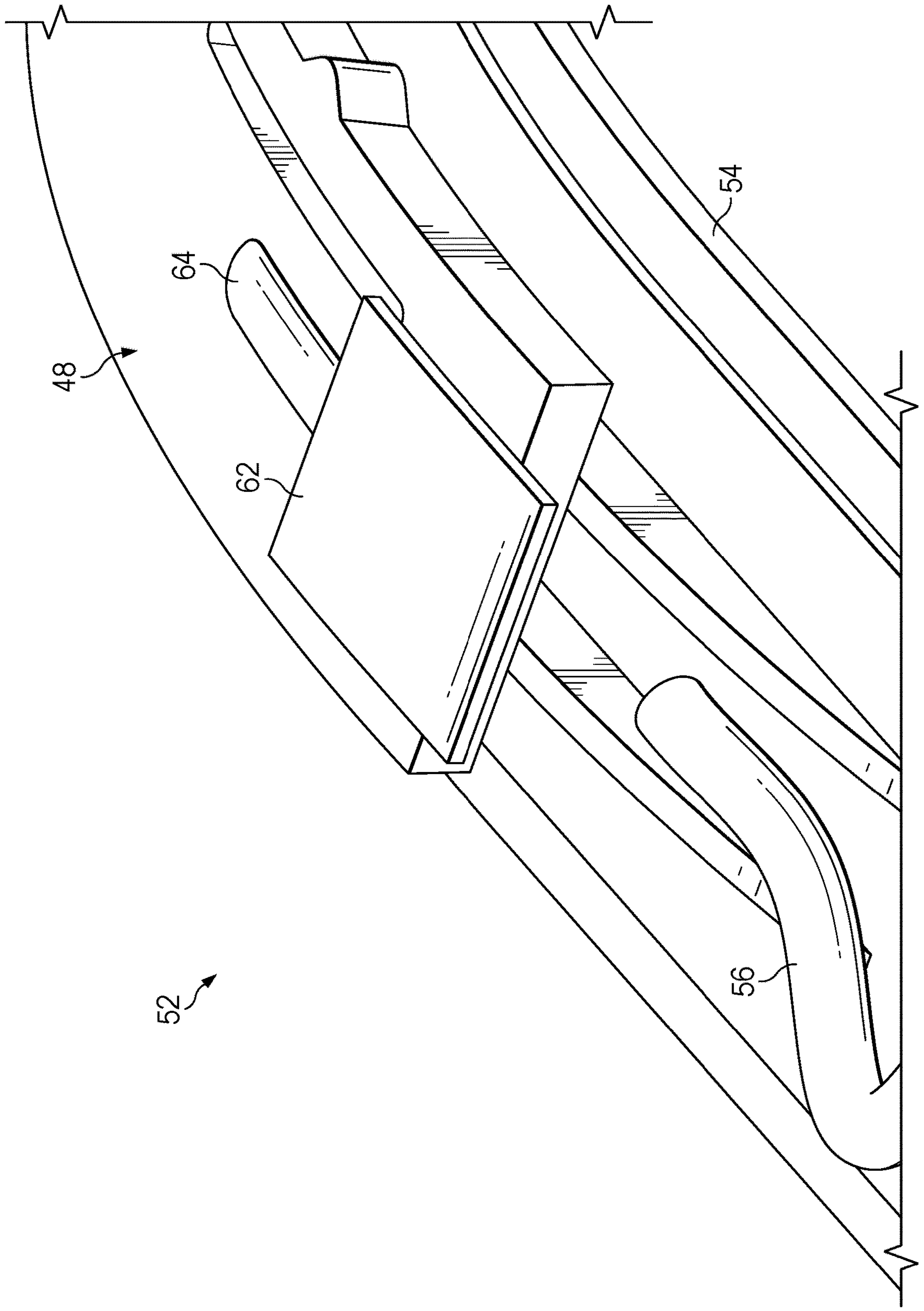

Referring now to FIGS. 5A and 5B, example embodiments depict the position sensor disposed in the headband to detect the earcup positions. FIG. 5A depicts a side perspective view of strap position sensor 52 having an optical sensor 58 that detects a blocking rib 60 extending from strap 48 to determine the strap position for communication through coiled wire 56. In the example embodiment, optical sensor 58 detects strap 48 when strap 48 retracts relative to headband lower portion 54 at a defined location that indicates travel of greater than the amount of travel allowed for normal headset adjustment of the opposing side strap 46. FIG. 5B depicts an alternative embodiment for strap position sensor 52 having a conductive material 64, such as a copper strip, coupled to strap 48 that closes a circuit of a contact sensor 62 when strap 48 retracts by a defined amount relative to the headband upper portion on which contact sensor 62 is coupled.

Figure 6:
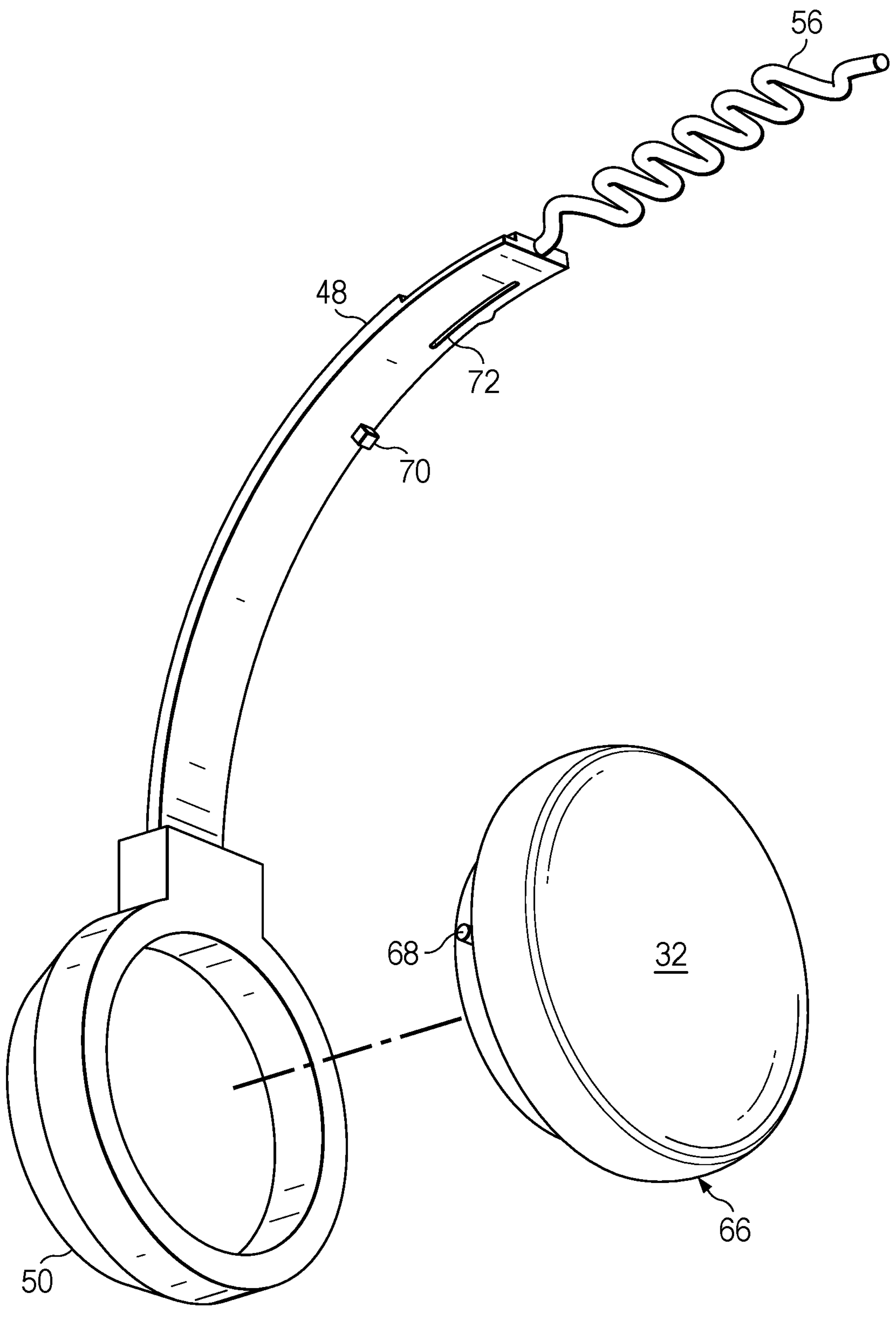
FIG. 6 depicts an exploded view of the headset earcup that displaces above an end user ear.

Referring now to FIG. 6, an exploded view depicts the headset earcup 50 that displaces above an end user ear. Strap 48 includes a stop 70 that defines a limit of retraction into the headband. Ratchet bumps 72 on one side of strap 48 engage with an adjustment mechanism of the headband to hold the strap at a desired position selected by an end user. Coiled wire 56 provides a resilient wired interface to support longer travel distances associated with extension and retraction of strap 48. Earcup 50 includes a snap opening that engages with a swivel rod 68 to allow rotational movement of earpad 66 relative to earcup 50 so that speaker 32 within earpad 66 remains normal the end user's ear with a level of comfort.

Figure 7:
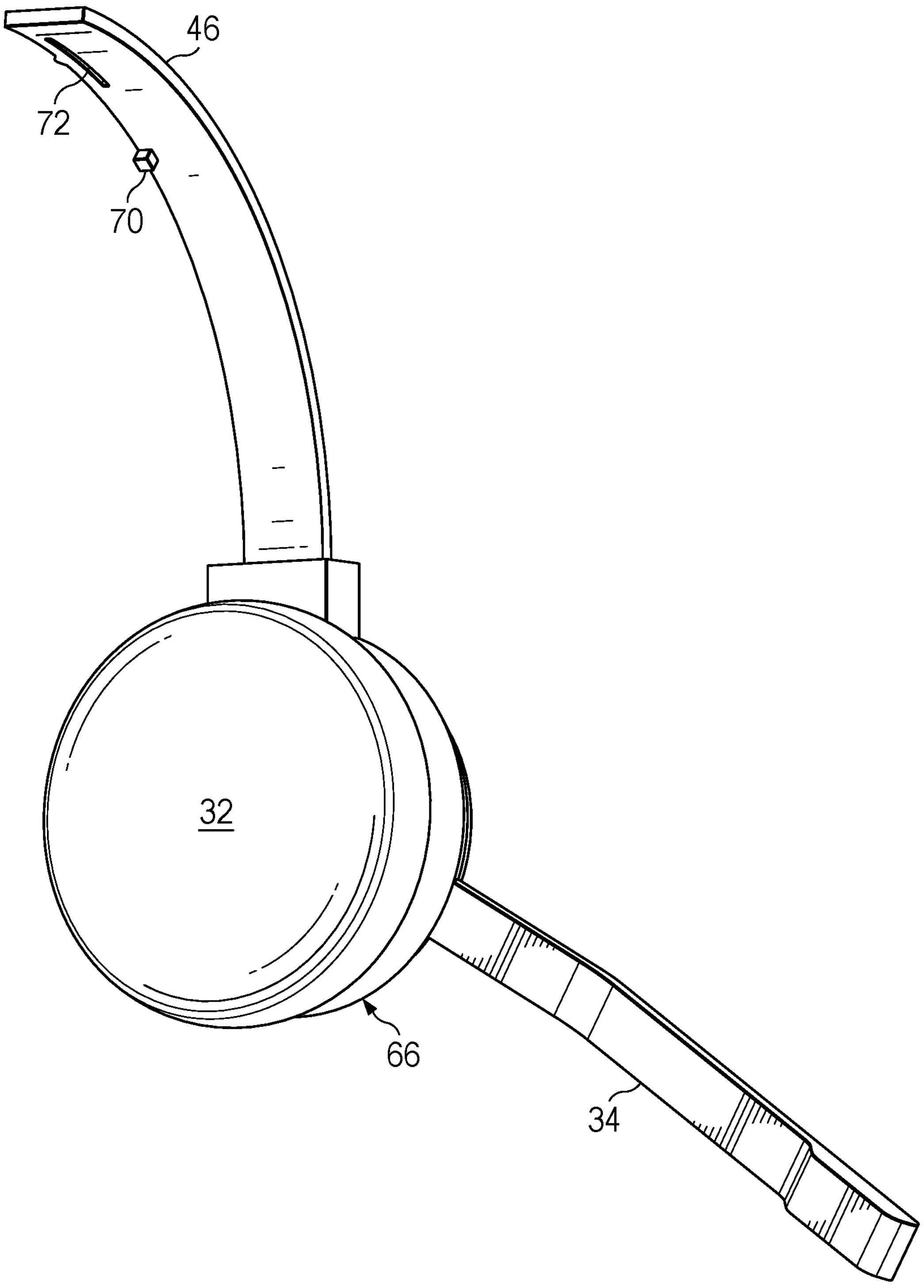
FIG. 7 depicts an exploded view of the headset earcup that has audio adjusted when it is the only earcup of the headset presenting audio.

Referring now to FIG. 7, an exploded view depicts the headset earcup that has audio adjusted when it is the only earcup of the headset presenting audio. Microphone 34 rotates 360 degrees relative to the earcup so that an end user can configure the headset to have microphone 34 on a right or left side. Earpad 66 rotates slightly relative to the earcup to provide comfort to the end user and normal orientation of speaker 32 disposed in earpad 66. A stop 70 and ratchets 72 engages with the headband to regulation strap 46 travel and position.

Figure 8:
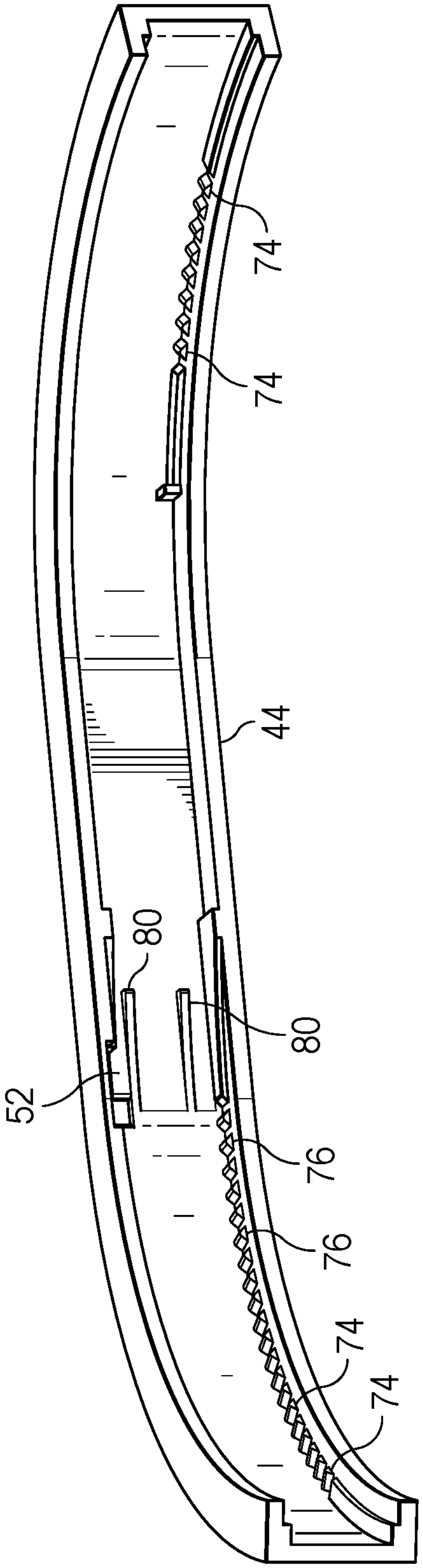
FIG. 8 depicts an adjustment structure that holds the headband straps in place when the earcups adjust to cover and uncover an ear.

Referring now to FIG. 8, an adjustment structure is depicted that holds the headband straps in place when the earcups adjust to cover and uncover an ear. Headband 44 upper portion is depicted with ratchet features 74 that engage the strap ratchet bumps to hold the strap in position for normal usage dual speaker configuration use of the headset. An extra length of ratchet features 76 provides the adjustment structure for the strap that holds the earcup displaced above the ear as described above. The strap position sensor 52 is held in position with extended feature ribs 80 that guide the strap to the fully retracted position.

Figure 9:
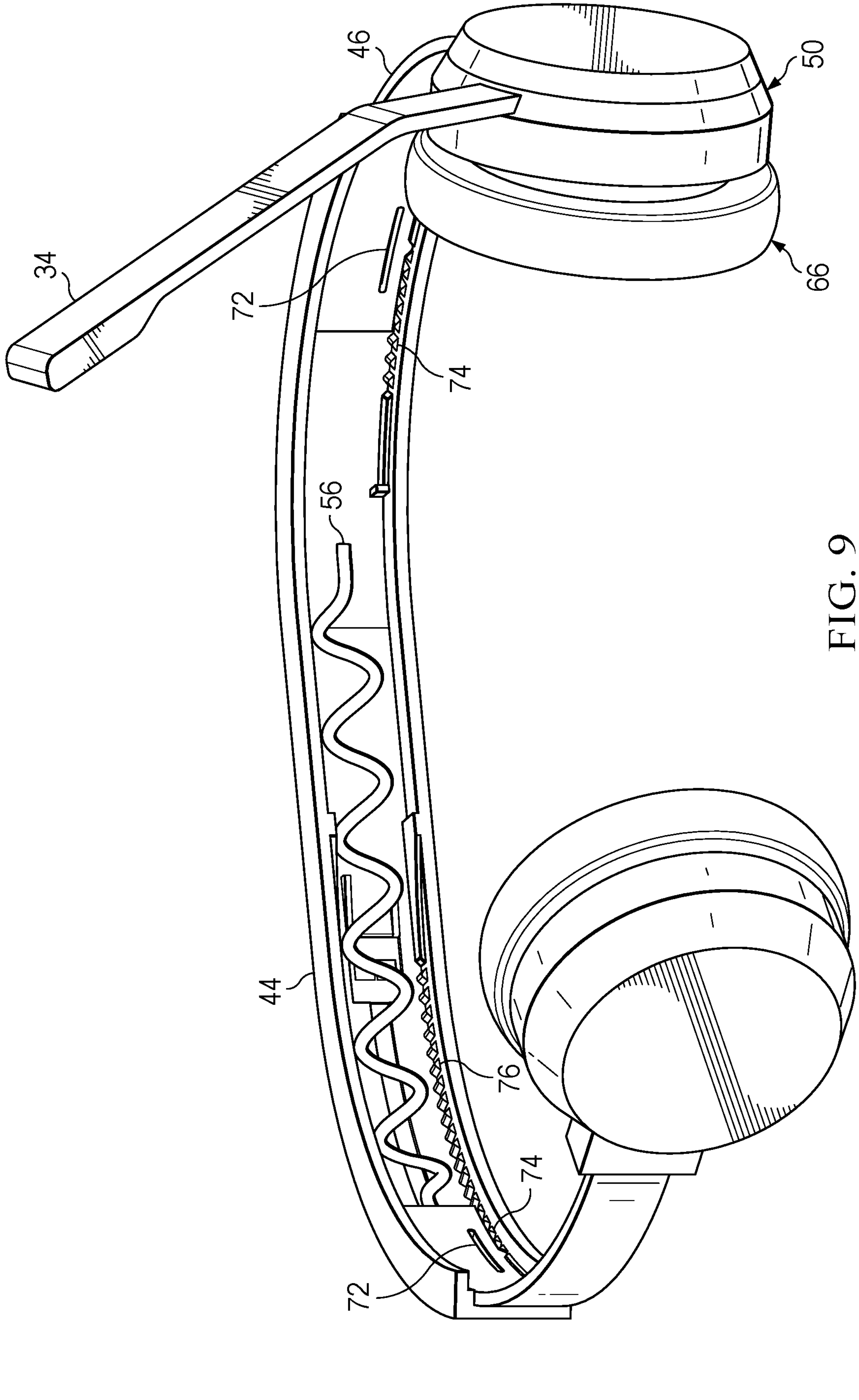
FIG. 9 depicts the headset with the lower surface removed to expose the strap interaction with the adjustment structure.

Referring now to FIG. 9, the headset is depicted with the lower surface removed to expose the strap interaction with the adjustment structure. Ratchet bumps 72 on each of straps 46 and 48 engage with ratchet features 74 to adjust earcups 50 and earpad 66 for normal operation with a range of travel typical to normal headset use. Headband 44 includes a set of ratchet features 76 for strap 48 that support a greater amount of travel so that the earcup 50 of strap 48 is displaced above an end user's ear. Coiled wire 56 aids in the greater travel length of strap 48 represented by both ratchet features 74 and 76. When strap 48 engages in the same travel length as strap 46 as represented by the ratchet features 74, strap position sensor 52 does not detect the strap so that a dual speaker configuration is applied to present audio. When strap 48 travels beyond the range of dual speaker configuration, that is beyond the ratchet features 74 and to the ratchet features 76, a single speaker configuration is applied based upon sensing by strap position sensor 52 of the strap position.

Figure 10:
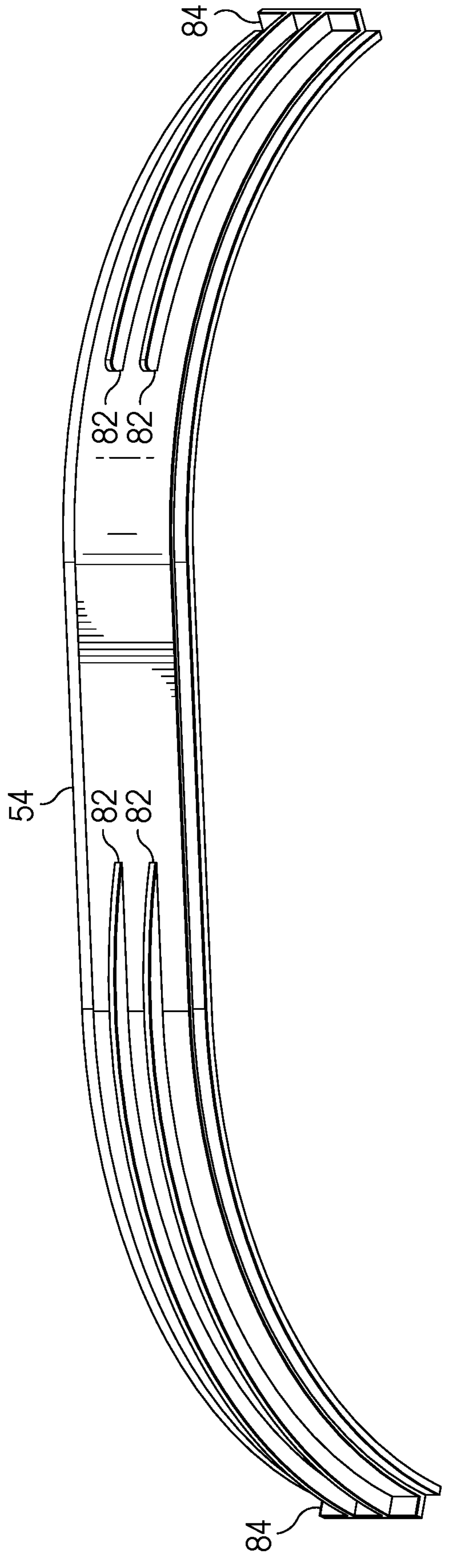
FIG. 10 depicts a headset lower surface with guides for different travel distances of earcup bands.

Referring now to FIG. 10, a headset lower surface is depicted with guides for different travel distances of earcup bands. The headband lower portion 54 couples to the bottom of the headband so that guide features 82 can engage the straps and aid in the positioning of the earcups. An extension stop feature 84 defines the limit of travel of the straps captured between the headband lower portion 54 and the headband upper portion.

Although the present invention has been described in detail, it should be understood that various changes, substitutions and alterations can be made hereto without departing from the spirit and scope of the invention as defined by the appended claims.

What is claimed is:

1. An information handling system comprising:

a processor operable to execute instructions that process information;

a memory interfaced with the processor and operable to store the instructions and information;

an audio processor operable to further process the information as audible sounds at a speaker; and a headset interfaced with the audio processor and having first and second earcups coupled to a headband, the headband configured to adjust the first earcup a first distance and the second earcup a second distance of greater than the first distance, the headset further having a position sensor and a processing resource, the processing resource including non-transitory memory storing instructions that when executed on the processing resource cause the headset to adjust the presentation of sound from the second earcup when the position sensor detects a predetermined position of the second earcup;

wherein the headband comprises:

a first strap coupled to the first earcup having a first travel distance;

a second strap coupled to the second earcup having a second travel distance of greater than the first travel distance; and an adjustment structure interfaced with the first strap and second strap to hold the first strap and second strap in a selected position of the first travel distance and the second travel distance.

2. The information handling system of claim 1 wherein:

the predetermined position is associated with the second earcup removed from an ear of an end user while the first earcup remains on another ear of the end user; and the instructions adjust the presentation of sound by turning off sound at the second earcup.

3. The information handling system of claim 2 wherein the instructions further cause the headset to adjust presentation at the first earcup when the position sensor detects the predetermined position of the second earcup.

4. The information handling system of claim 3 wherein the instructions adjust the presentation of the first earcup by playing monoaural audio instead of stereo audio at the first earcup.

5. The information handling system of claim 3 wherein the instructions adjust the presentation of the first earcup by increasing volume of audio output at the first earcup.

6. The information handling system of claim 1 wherein the position sensor comprises an optical sensor configured to detect adjustment of the second strap of greater than the first travel distance.

7. The information handling system of claim 6 wherein the position sensor comprises a conductive material configured to close a circuit the second strap travels greater than the first travel distance.

8. The information handling system of claim 2 wherein the instructions further adjust the presentation of sound by turning off noise cancellation.

9. A method for presenting audio at a headset, the method comprising:

detecting a first earcup of the headset having a predetermined length relative to a second earcup of the headset;

in response to the detecting, turning off audio to the first earcup while maintaining audio to the second earcup;

coupling the first earcup to an adjustment structure with a first strap having a first travel distance; and coupling the second earcup to the adjustment structure with a second strap having a second travel distance of less than the first travel distance.

10. The method of claim 9 further comprising in response to the detecting, playing audio at the second earcup in monoaural instead of stereo.

11. The method of claim 10 further comprising in response to the detecting, increasing audio sound at the second earcup.

12. The method of claim 9 wherein the detecting further comprising detecting that the first strap has a travel distance of greater than the second travel distance.

13. The method of claim 9 wherein the detecting further comprises detecting a position of the first strap with an optical sensor.

14. The method of claim 9 wherein the detecting further comprises closing a circuit with a conductive material coupled to the first strap.

15. A headset comprising:

a headband, the headband having first and second straps and an adjustment structure interfaced with the first strap and the second strap to hold the first strap and the second strap in a selected position of a first travel distance and a second travel distance;

first and second earcups coupled to the headband, the first earcup coupled to the first strap, the second earcup coupled to the second strap, the headband configured to adjust the first earcup the first travel distance and the second earcup the second travel distance of greater than the first travel distance;

a position sensor operable to detect a position of the second earcup; and a processing resource, the processing resource including non-transitory memory storing instructions that when executed on the processing resource cause the headset to adjust the presentation of sound from the second earcup when the position sensor detects a predetermined position of the second earcup.

16. The headset of claim 15 wherein:

the predetermined position is associated with a range of movement of the second earcup at which the second earcup is removed from an ear of an end user while the first earcup remains on another ear of the end user; and the instructions adjust the presentation of sound by turning off sound at the second earcup.

17. The headset of claim 16 wherein the instructions adjust the presentation of the first earcup by playing monoaural audio instead of stereo audio at the first earcup.

18. The headset of claim 16 wherein the instructions adjust the presentation of the first earcup by increasing volume of audio output at the first earcup.

* * * * *